United States Patent

[11] 3,607,386

[72] Inventors Robert T. Galla;
Harold M. Greenhouse, both of Baltimore, Md.
[21] Appl. No. 734,330
[22] Filed June 4, 1968
[45] Patented Sept. 21, 1971
[73] Assignee The Bendix Corporation

[54] METHOD OF PREPARING RESISTIVE FILMS

7 Claims, 3 Drawing Figs.

[52] U.S. Cl. 117/217, 29/620, 117/106, 117/107, 117/227, 338/308
[51] Int. Cl. B44d 1/18
[50] Field of Search 117/106, 107, 217, 227; 338/308; 29/620

[56] References Cited

UNITED STATES PATENTS

| | | | |
|---|---|---|---|
| 3,056,937 | 10/1962 | Pritikin | 117/217 UX |
| 3,308,528 | 3/1967 | Bullard et al. | 117/106 UX |
| 3,458,847 | 7/1969 | Waits | 338/308 X |
| 3,472,688 | 10/1969 | Hayashi et al. | 117/217 X |

*Primary Examiner*—Alfred L. Leavitt
*Assistant Examiner*—C. K. Weiffenbach
*Attorneys*—Plante, Arens, Hartz & O'Brien, Bruce L. Lamb and William G. Christoforo

ABSTRACT: A method of preparing temperature stable high resistance, thin film resistors, wherein a metal whose oxide or silicide has a higher resistivity than the pure metal is vacuum evaporated through a suitable mask onto a glass substrate which has been completely undercoated with a layer of silicon monoxide. Immediately after the deposition of the metallic film a silicon monoxide overcoat is deposited through the same mask. The resulting resistors are heat treated for such time as is required to bring the resistors to the desired value. The resulting resistors have a low-temperature coefficient and relatively high sheet resistivities.

INVENTORS
ROBERT T. GALLA
HAROLD M. GREENHOUSE

BY William G. Christoforo
ATTORNEY

METHOD OF PREPARING RESISTIVE FILMS

BACKGROUND OF THE INVENTION

This invention relates to a method of producing thin film resistors having high sheet resistivities and low-temperature coefficients.

A number of methods of producing vacuum deposited thin film, high resistivity resistors have been tried. One method has been to vacuum deposit a very thin layer of metal on a glass substrate, thereby effecting an inherently high-resistance resistor due solely to the small cross-sectional area thereof. Another method has been to vacuum deposit, simultaneously, a mixture of ceramic and metal on a substrate, thereby producing an apparently continuous film of a conductive metal interdispersed with the nonconductive ceramic. In both of these methods the resistance of the film is monitored as the film is laid down. When the resistance of the film reaches the desired point, the vacuum depositing is stopped. In practice, it is very difficult to completely stop the deposition of material at a precise instant. Additionally, when extremely high resistivities are desired the depositing time is so short that it is impossible to stop the deposition of material with any degree of accuracy so that films having a very wide range of resistance are thus obtained. Another approach has therefore been to allow the deposition of materials to continue to a point where the resistance is lower than desired, at which time the deposition of material is stopped. Thereafter the films are heated, thereby causing oxidation of the metallic conductor or a change in the film structure, or both, to effect an increase in resistivity. When the film has reached the desired resistivity the heating is terminated and the film is stabilized by one of various methods. These high resistance thin films are characterized by their extremely poor temperature coefficient and the fact that the resistance tends to increase with age of the film. This is probably due to the continuing oxidation of the thin film, the attempts to stabilize the film not having been completely successful. Additionally, the almost inexhaustible supply of impurities in the glass continues to migrate across the glass-metal film interface, thereby also causing the resistance of the film to drift.

SUMMARY OF THE INVENTION

Accordingly, a method of producing thin film resistors has been devised wherein a glass substrate has vacuum evaporated upon it a thin layer of silicon monoxide, so as to seal the impurities in the glass substrate and thereby prevent them from interacting with any film subsequently laid on the glass. Resistor terminals in the form of phased-in vacuum evaporated chromium-gold land patterns are then laid on the silicon monoxide with a layer of nickel or other metal whose oxide or silicide has a higher sheet resistivity than the pure metal vacuum deposited thereover so as to bridge the terminals. During the deposition of the metallic film the resistance of a portion of the film is monitored, with deposition being stopped in the case of nickel before the resistance of the film falls below 6,000 ohms per square. Immediately thereafter a silicon monoxide overcoat at least 10,000-Angstroms thick is laid over the nickel. The resulting films are heat treated at a temperature which is determined by the final resistivity required. The resistors are then stabilized in air at 260° C. for a minimum of 24 hours. After the temperature soak at 260° C. the resistors are brought back to room temperature.

DESCRIPTION OF THE PREFERRED EMBODIMENT

Figure 1:
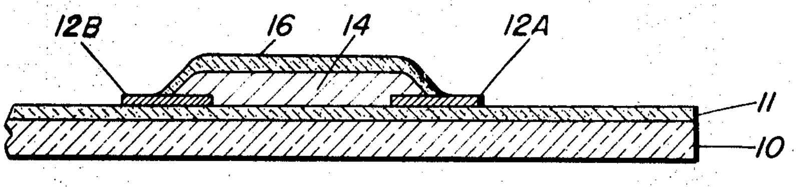
FIG. 1 is a cross section of a resistive film made in accordance with the method of the present invention.

Referring to FIG. 1, a glass substrate 10 is prepared in the normal manner for having a thin film deposited thereon. In a vacuum, a silicon monoxide layer 11 is deposited upon the prepared glass substrate. Chromium-gold land patterns 12A and 12B, suitable for interconnecting a completed resistor to other circuitry, are then evaporated upon the silicon monoxide with a nickel layer 14 evaporated therebetween. Although this portion of the preferred embodiment deals with nickel films, the process is similar for other metals. The process differences and the results to be expected when other commonly used resistance metal films are used will be shown below. During deposition of the nickel film the resistivity of a selected segment of the film is monitored and is halted while the sheet resistivity, which decreases with additional nickel deposition, is still in excess of 6,000 ohms per square. It has been found that it is practical and possible to stop the deposition of the nickel while the sheet resistivity is between 100,000 and 6,000 ohms per square. Immediately thereafter a silicon monoxide overcoat 16, 10,000-Angstroms thick is deposited through the same mask. The resulting resistors are then heat treated for at least 30 minutes at a temperature between 260° C. and 400° C. depending upon the desired stable resistance. The resistors are then stabilized in air at 260° C. for a minimum of 24 hours during which time the resistivity will not change. This stabilizing treatment allows an equilibrium to be established at the nickel boundaries. Thereafter these films will exhibit no resistivity creep at temperatures less than the heat treatment temperature.

Figure 2:
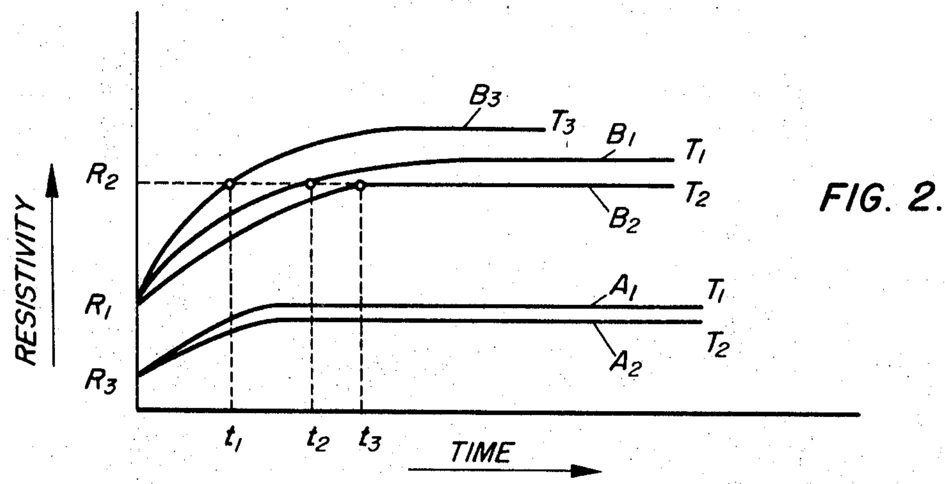
FIG. 2 is a typical plot of resistivity versus heat treatment time at various temperatures.

FIG. 2 illustrates how the resistivity of a film will increase with time during heat treatment and will finally reach equilibrium at a given temperature. It can be seen that final resistivity is dependent upon resistivity before heat treatment, temperature during heat treatment and length of heat treatment if equilibrium has not been reached.

Curves $B_1$, $B_2$ and $B_3$ are isothermal curves at temperatures $T_1$, $T_2$ and $T_3$, respectively, and illustrate the interrelationship of the heat treatment temperatures and times. Curves $B_1$, $B_2$ and $B_3$ show a resistance film having a sheet resistivity $R_1$ before heat treatment, while curve $B_1$, in particular, shows that when this film is heated at temperature $T_1$ for time $t_2$ its sheet resistivity will increase to $R_2$. The film may then be stabilized in the manner aforementioned. This film will thereafter exhibit temperature stability as long as its temperature remains below $T_2$, the temperature at which the sheet resistivity terminates in the value $R_2$. If the film is heated after stabilization at a temperature above $T_2$ for a sufficient period of time, the sheet resistivity will change. For example, if the resistive film is subsequently heated at temperature $T_3$ the sheet resistivity will increase.

Curves $A_1$ and $A_2$ are also isothermal curves at temperatures $T_1$ and $T_2$ respectively showing the change in resistivity during heat treatment of a thin film resistor made of the same materials as the thin film resistor whose resistivity change is plotted by curves $B_1$, $B_2$ and $B_3$ but which has an initial resistivity $R_3$ lower than $R_1$.

There are other ways in which the film may be heat treated, the significant process step being the raising of the temperature of the resistor. This can be accomplished in several ways, such as by using radiant heat, electrical current flow through the resistor, a laser beam, microwave bombardment or other forms of electromagnetic energy. Additionally, the resistance of a film sector can be monitored during the temperature processing and compared to a standard resistor with the resistance difference comprising an error signal in a temperature controlling servoloop. In this manner the temperature is increased until the desired resistivity is reached, at which time the temperature is stabilized. Another method of heat treating a film is to make the film one arm of an AC bridge with the unbalanced bridge current controlling a DC power supply, thereby heating the film. As the bridge reaches a balanced state, indicating the film is approaching the desired resistivity, the DC current decreases.

Figure 3:
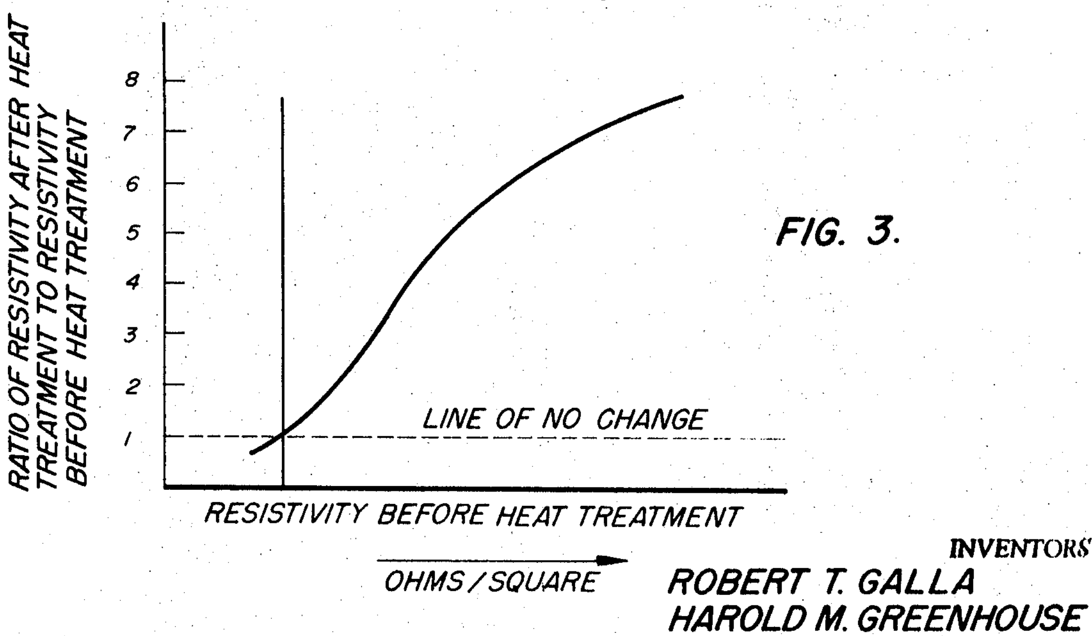
FIG. 3 is a plot illustrating the relationship between maximum possible resistivity after heat treatment and resistivity before heat treatment.

FIG. 3 shows how the maximum possible resistivity of a nickel film after heat treatment depends upon the resistivity of the film before heat treatment. It can also be seen that the percentage increase in resistivity increases as the resistivity before heat treatment increases. The reasons for this will be discussed later. The importance of not allowing the resistivity of the freshly applied nickel film to go below 6,000 ohms per square is seen from the fact that nickel films having initial sheet resistivities below 6,000 ohms per square will show no change or perhaps even a drop in resistivity upon subsequent heat treatment, while similar films having resistivities over 6,000 ohms per square will exhibit the resistivity rise desired, with the ratio of maximum possible resistivity after heat treatment increasing as the resistivity before heat treatment increases.

In order to explain the theory underlying the method for producing these films of exceptionally high resistivity and stability and also to provide a theory whereby the characteristic behavior of other metals when used in this process can be predicted, the mechanisms of formation and subsequent stabilization of the film will be discussed. Two mechanisms control the formation of these resistive films: an oxidation mechanism and a structural rearrangement mechanism. Briefly, the oxidation mechanism involves either partial or complete, but controlled, oxidizing or siliciding of the metal film resulting in a change in resistivity, while the structural rearrangement mechanism involves both internal and surface structural changes which cause a change in resistivity. The observed gross resistivity change is due to a combination of the actions of the two mechanisms.

THE OXIDATION MECHANISM

When a thin metal film is deposited upon an oxide an interaction between contiguous layers of the oxide and metal is probable. A diffusion of metal into the oxide and diffusion of silicon or of the oxygen into the metal will result in an intermediate layer whose resistivity depends upon the materials involved in the reaction. This reaction and the depth of the reaction into the layers of the various materials, will depend upon the temperature of the specimen and the length of time that the specimen is held at the particular temperature. Raising the resistor to a subsequent higher temperature will necessarily render a new diffusion depth with further altered resistivity. This differs from an ordinary diffusion in that the diffusion depth is a large percentage of the metal film thickness and the amount of metal and oxide available for diffusion is limited by the small mass of the films. The result is that an upper temperature exists at which diffusion and hence altered resistivity, either by oxidation or by microalloying of other components of the adjacent film no longer occurs.

Addition of an overcoat provides a limited diffusion source at one face of the metal film while limiting the amount of oxygen available from the atmosphere, thereby essentially passivating that face. The undercoat prevents diffusion of alkali ions or other highly mobile contaminants from the substrate into the metal film. A symmetrical diffusion condition is thus presented to the metal film.

It should be apparent that as the thickness of the metal film increases, the diffusion occurring at the metal boundaries has less effect upon the total resistivity of the sandwiched film. For very thick films, changes in resistivity are due to simple structural annealing which also appears in the bulk material. Additionally, metal films which do not interdiffuse or interdiffuse to a relatively infinitesimal degree with the under and overcoated materials will not show this change in resistivity when subjected to heat treatment.

The chemical equation of the general reaction is:

$$Si + SiO + (2x+1)\,Me = MeO + 2\,Me_xSi$$

where Me is a metal, and the Si is in excess in the SiO film.

Example: $Si + SiO\,(2x+1)\,Ni = NiO + 2\,Ni_xSi$.

If the reaction products have a higher resistivity than the original metal film, the resultant resistivity will, of course, increase upon heat treatment. If, however, certain of the reaction products have higher resistivities and others have lower resistivities than the original metal film, it is necessary to determine the relative occurrence of the reaction products before sheet resistivity after heat treatment can be predicted. This is determined by determining the change in free energy for the various reaction products and the depth of reaction. For the materials previously mentioned, that is, for a nickel film with silicon monoxide coats, it is known that the resistivity of nickel oxide and nickel silicide is higher than the resistivity of nickel. It is also known by analysis of the change in free energy of reaction for nickel oxide and nickel silicide that there is a large probability of forming nickel oxide or nickel silicide at the temperatures of interest when nickel is exposed to both oxygen and silicon or silicon monoxide. The theory thus explains the characteristic increase in sheet resistivity of a nickel film when treated as taught by this invention. That the percentage increase in sheet resistivity of a conductive film after heat treatment is dependent upon the sheet resistivity of the film before heat treatment can be explained as follows. It is known that the sheet resistivity of a film is inversely proportional to its thickness. The depth to which oxidation will occur, however, is not dependent upon film thickness but is dependent upon the materials involved and temperature of reaction. Thus the relative depth to which oxidation will occur with respect to the film thickness is dependent upon the initial film thickness, or in other words, is dependent upon the initial sheet resistivity of the film for a given set of materials and reaction temperatures. When the initial sheet resistivity is high, the film is known to be thin so that the relative reaction depth is high with resultant marked sheet resistivity change. Where the initial sheet resistivity is low, the film is known to be relatively thicker so that the relative reaction depth is less with resultant smaller percentage sheet resistivity change. At some initial sheet resistivity, the film will be so thick that the reaction depth will be insignificant with respect thereto so that any resistivity change obtained as a result of following the teachings of this invention will not be significant. This line of no change as shown in FIG. 3 occurs for nickel when the initial sheet resistivity is 6,000 ohms per square. The drop in sheet resistivity below 6,000 ohms per square is obtained from the structural rearrangement of the nickel film or from the structural smoothing of the nickel/silicon monoxide interface during heat treatment, which is more fully explained in a following section describing the structural rearrangement mechanism.

Other metals which will form oxide or silicide films when coated with silicon monoxide and heat treated are known by their affinity with oxygen or silicon and their ability to obtain oxygen from the silicon monoxide coats. These metals are:

Chromium
Molybdenum
Tungsten
Iron
Cobalt
Titanium
Zirconium
Hafnium
Vanadium
Niobium
Tantalum
Aluminum Treatment of films of these metals in accordance with the teachings of this invention will result in films having increased sheet resistivities over initial sheet resistivities where the initial sheet resistivity is in the region above the line of no change for the particular metal being treated. More particularly, for chromium it has been determined that sheet resistivity of a chromium film will increase upon treatment in accordance with the teachings of this invention only if the initial resistivity of the chromium film is above approximately 100,000 ohms per square.

STRUCTURAL REARRANGEMENT MECHANISM

Metal films of high resistivity are necessarily very thin, being on the order of 10 to 100-atom layers thick. Because of this thinness and the relatively long mean free path of the electrons, several hundred atom layers in some cases, scattering of the electron from the surface of a thin film has a large effect on resistivity. Agglomeration of the atoms is common in this range of thickness so that the film may not be uniform. When a film is initially formed, the surface structure is granular having been frozen in by the rapid condensation on the substrate. Subsequent heat treatment at temperatures higher than the original condensation temperature permits structural smoothing of the surface or the film itself resulting in lower resistivity. Deposition of an insulating overcoat on the metal film can increase the resistivity of an agglomerated thin film by introducing a large dielectric constant between the metal grains. Subsequent heat treatment in the former case permits interdiffusion of the metal and dielectric resulting in a cermet formation. Additionally, the deposition of the insulating overcoat can immediately reduce the resistivity of a granular surface film by smoothing action, or increase the resistivity of a smooth film by roughening.

Although we have shown what we consider to be the preferred embodiment of our invention, certain alterations and modifications will become apparent to one skilled in the art. We do not wish to limit our invention to the specific forms shown and accordingly hereby claim as our invention the subject matter including modifications and alterations thereof encompassed by the true scope and spirit of the appended claims.

1. A method of preparing resistive films on a substrate comprising:
- vacuum depositing a first silicon monoxide coat on said substrate;
- vacuum depositing a metal film, selected from the group consisting of nickel and chromium, on said first coat to a sheet resistivity in excess of a predetermined sheet resistivity, said predetermined sheet resistivity being 6,000 ohms per square for said nickel metal film and 100,000 ohms per square for said chromium metal film;
- vacuum depositing a second silicon monoxide coat over said metal film; and
- heat treating said resistive film at temperatures between 260° C. and 400° C.

2. A method of preparing resistive films on a substrate comprising:
- vacuum depositing a first silicon monoxide coat on said substrate;
- vacuum depositing a nickel film on said first coat to a sheet resistivity in excess of 6,000 ohms per square;
- vacuum depositing a second silicon monoxide coat over said nickel film; and
- heat treating said resistive film at temperatures between 260° C. and 400° C.

3. A method of preparing resistive films on a substrate as recited in claim 1 wherein said first silicon monoxide coat is deposited to a depth sufficient to isolate said nickel film from said substrate and said second silicon monoxide coat is deposited to a depth sufficient to isolate said nickel film from atmospheric air.

4. A method of preparing resistive films on a substrate as recited in claim 3 wherein said first silicon monoxide coat is deposited to a depth of approximately 2,500 Angstroms, and said second silicon monoxide coat is deposited to a depth of approximately 10,000 Angstroms.

5. A method of preparing resistive films on a substrate comprising:
- vacuum depositing a first silicon monoxide coat on said substrate;
- vacuum depositing a chromium film on said first coat to a sheet resistivity in excess of 100,000 ohms per square;
- vacuum depositing a second silicon monoxide coat over said chromium film; and
- heat treating said resistive film at temperatures between 260° C. and 400° C.

6. A method of preparing resistive films on a substrate as recited in claim 5 wherein said first silicon monoxide coat is deposited to a depth sufficient to isolate said chromium film from said substrate and said second silicon monoxide coat is deposited to a depth sufficient to isolate said chromium film from atmospheric air.

7. A method of preparing resistive films on a substrate as recited in claim 5 wherein said first silicon monoxide coat is deposited to a depth of approximately 2,500 Angstroms, and said second silicon monoxide coat is deposited to a depth of approximately 10,000 Angstroms.